US007145068B2

(12) United States Patent
Mizuno

(10) Patent No.: US 7,145,068 B2
(45) Date of Patent: Dec. 5, 2006

(54) MUSIC INFORMATION DISPLAY APPARATUS AND METHOD

(75) Inventor: Shigehiko Mizuno, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/200,845

(22) Filed: Aug. 10, 2005

(65) Prior Publication Data

US 2006/0032360 A1 Feb. 16, 2006

(30) Foreign Application Priority Data

Aug. 10, 2004 (JP) ............................ 2004-233372

(51) Int. Cl.
*G09B 15/00* (2006.01)
*G09B 15/02* (2006.01)
*G10H 1/00* (2006.01)

(52) U.S. Cl. .................................... 84/477 R; 345/107

(58) Field of Classification Search .............. 84/470 R, 84/471 R, 477 R, 478; 345/107
See application file for complete search history.

(56) References Cited

U.S. PATENT DOCUMENTS

| | | | | |
|---|---|---|---|---|
| 5,400,687 | A * | 3/1995 | Ishii | 84/477 R |
| 5,760,323 | A * | 6/1998 | Romero et al. | 84/470 R |
| 5,894,100 | A | 4/1999 | Otsuka | |
| 6,483,019 | B1 * | 11/2002 | Hamilton | 84/477 R |
| 6,538,188 | B1 | 3/2003 | Kondo | |
| 6,809,246 | B1 * | 10/2004 | Errico | 84/477 R |
| 2001/0020935 | A1 * | 9/2001 | Gelbman | 345/173 |
| 2002/0030638 | A1 * | 3/2002 | Weiner | 345/30 |

FOREIGN PATENT DOCUMENTS

| | | | |
|---|---|---|---|
| EP | 1 319 969 | A2 | 6/2003 |
| EP | 1 345 116 | A1 | 9/2003 |
| JP | 2003-303247 | A | 10/2003 |
| WO | WO 01/50452 | A2 | 7/2001 |

OTHER PUBLICATIONS

European Search Report, issued Jan. 4, 2006, in the corresponding European Patent Application No. 05107126.4.

Crawford, G.P.; "A bright new page in portable displays," IEEE Spectrum, Oct. 2000, pp. 40-46.

E INK Corporation; "First-generation Electronic Paper Display from Philips, Sony and E Ink to be used in new electronic reading device;" Online!, Mar. 24, 2004, XP002357272; Retrieved from the Internet: URL:http://www.eink.com/press/releases/pr70.html>retrieved on Feb. 12, 2005.

* cited by examiner

*Primary Examiner*—Jeffrey W Donels
(74) *Attorney, Agent, or Firm*—Rossi, Kimms & McDowell, LLP

(57) ABSTRACT

Music information display apparatus includes an electronic paper, and a control section that controls the electronic paper to switch to a display of music information, corresponding to a music piece being reproduced, in synchronism with reproduction of the music piece. When music information is to be displayed on the electronic paper, an instruction is given, in consideration of a response time necessary for display switching of the electronic paper, for starting a display switching operation a predetermined time earlier than display-switching timing so that switching to a display of the music information corresponding to a currently-reproduced music piece section can be completed by the display-switching timing. In this way, the music information automatically updated in synchronism with the reproduction of the music piece can be displayed on the electronic paper, so that an easy-to-view and easy-on-the-eye display can be provided with minimized power consumption. Further, the music information can be appropriately displayed with no delay behind the reproduction of the music piece.

20 Claims, 3 Drawing Sheets

MUSIC INFORMATION DISPLAY APPARATUS AND METHOD

BACKGROUND OF THE INVENTION

The present invention relates generally to music information display apparatus and methods for displaying predetermined music information on display devices, as well as programs therefor. More particularly, the present invention relates to an improved music information display apparatus and method for displaying music information on a thin, lightweight and power-saving sheet-shaped electronic paper, as well as an improved program therefor.

Heretofore, electronic music apparatus, such as electronic musical instruments, have been known which are constructed to display music information, such as a musical score and/or lyrics, on a predetermined display device in accordance with acquired performance information, musical score display information or lyrics display information. One example of such electronic music apparatus is disclosed in Japanese Patent Application Laid-open Publication No. 2002-258838. In the conventional electronic music apparatus, like the one disclosed in the above-identified publication, there is employed a display device, such as a liquid crystal display (LCD) device or CRT display device, and music information corresponding to successive ranges or sections of a music piece is sequentially displayed on the display device, for example, in accordance with reproduction of the music piece, i.e. with the display of the music information automatically switched or updated in accordance with progression of the reproduction.

However, in the conventional electronic music apparatus, like the one disclosed in the above-identified publication, which employ a display device, such as a liquid crystal display (LCD) device or CRT display device, to display music information, there has been the significant inconvenience of extremely great electric power consumption, because the display device itself must be illuminated to display the music information on its screen and electric power must be constantly supplied to the display device to keep the music information displayed on the screen. Further, the illumination of the display device itself tends to make the eyes of a user tired, so that the display of the music information on the illuminated display device has been unsuitable for the user to view for a long time as compared to music information, such as a musical score and/or lyrics, printed on an ordinary sheet (or sheets) of paper or the like.

SUMMARY OF THE INVENTION

In view of the foregoing, it is an object of the present invention to provide an improved music information display apparatus and method which use an electronic paper as a display device for displaying music information to thereby not only minimize necessary electric power consumption but also permit an easy-to-view and easy-on-the-eye display of music information, as well as an improved program therefor.

In order to accomplish the above-mentioned object, the present invention provides an improved music information display apparatus, which comprises: an electronic paper; and a control section that controls a display by the electronic paper to visually display music information, corresponding to a music piece being reproduced, in synchronism with reproduction of the music piece.

The present invention also provides an improved music information display apparatus, which comprises: an electronic paper; an acquisition section that acquires music information related to reproduction and display of a music piece; a determination section that determines a predetermined lead time in accordance with a display response characteristic of the electronic paper; a detection section that, in accordance with reproduction of a music piece based on the acquired music information, detects timing for switching the display based on the acquired music information, in correspondence with the music piece being reproduced, earlier by the predetermined lead time than actual display-switching timing; and a display control section that, in accordance with the detection by the detection section, instructs the electronic paper to start a display switching operation based on the music information.

According to the present invention, music information to be visually displayed in synchronism with (progression of) reproduction of a music piece is displayed on the electronic paper, so that an easy-on-the eyes and easy-to-view visual display of the music information can be achieved with the necessary electric power consumption effectively reduced. Further, for displaying the music information on the electronic paper, a predetermined lead time is determined in accordance with a display response characteristic of the electronic paper, and the timing for switching the display based on the music information, in correspondence with the music piece being reproduced, is detected earlier than actual display-switching timing by the predetermined lead time, and thus, a display driving instruction is given to the electronic paper such that the electronic paper can start a display switching operation in response to the detection of the display-switching timing. Namely, an electronic-paper driving operation, intended to switch one display to another on the electronic paper, is started ahead of actual display-switching timing, in consideration of a display response delay time that would be involved when the electronic paper switches the display, in such a manner that switching to a display of music information corresponding to a currently-reproduced section of the music piece has been completed by predetermined display-switching timing. In this way, a display corresponding to currently-reproduced music information can be appropriately presented on the electronic paper with no delay behind the music piece reproduction.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
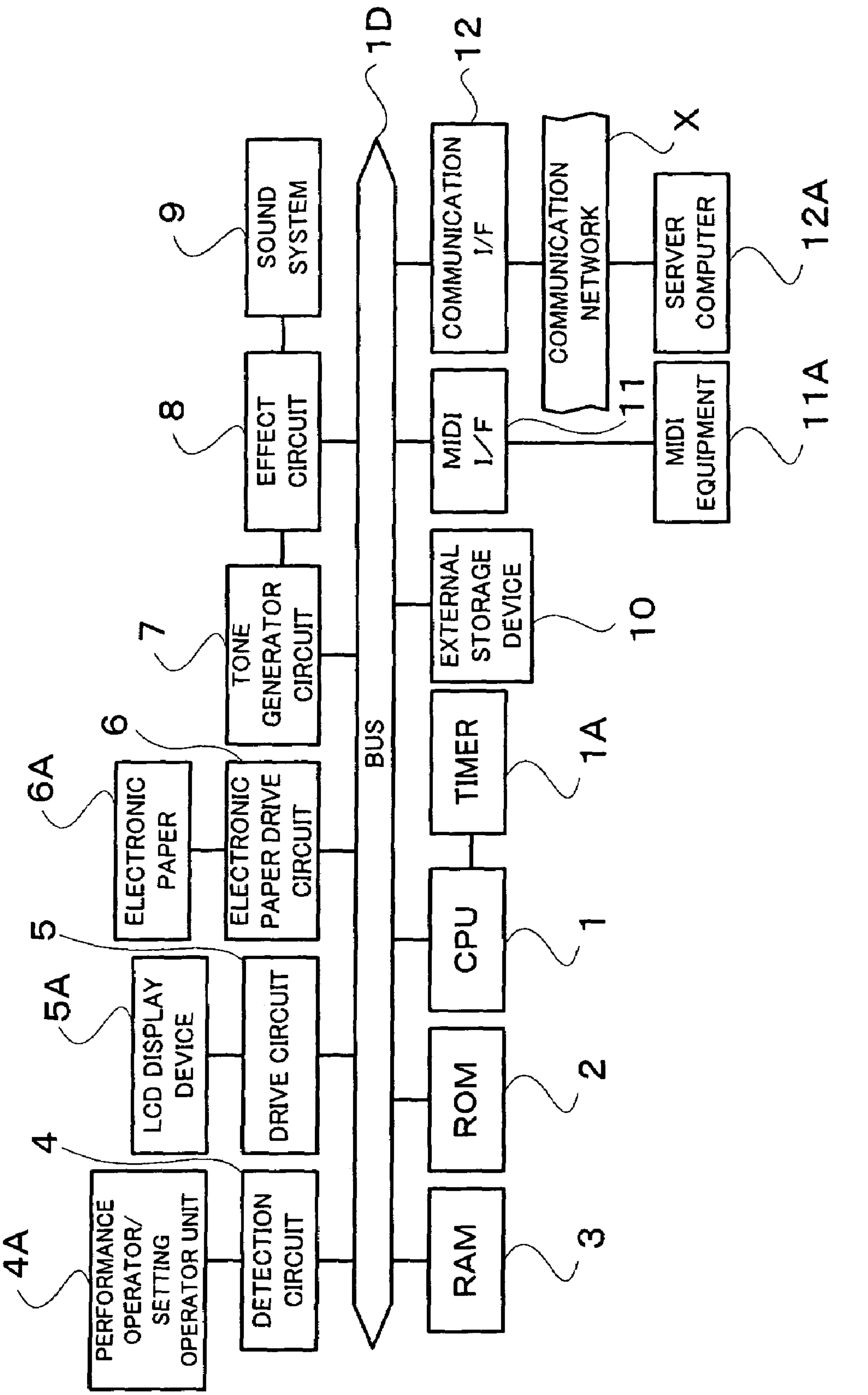
FIG. 1 is a block diagram illustrating a general hardware setup of an electronic music apparatus employing a music information display apparatus in accordance with an embodiment of the present invention.

FIG. 1 is a block diagram illustrating a general hardware setup of an electronic music apparatus employing a music information display apparatus in accordance with an embodiment of the present invention. This electronic music apparatus, such as an electronic musical instrument or personal computer, is controlled by a microcomputer comprising a microprocessor unit (CPU) 1, a read-only memory (ROM) 2 and a random-access memory (RAM) 3. The CPU 1 controls behavior of the entire electronic music apparatus. To the CPU 1 are connected, via a data and address bus 1D, the read-only memory 2, RAM 3, detection circuit 4, drive circuit 5, electronic paper drive circuit 6, tone generator (T.G.) circuit 7, effect circuit 8, external storage device 10, MIDI interface (I/F) 11 and communication interface 12. Also connected to the CPU 1 is a timer 1A for counting various time periods and intervals, for example, to signal interrupt timing for a timer interrupt process. For example, the timer 1A generates clock pulses, which are given to the CPU 1 as processing timing instructions or as interrupt instructions. The CPU 1 carries out various processes in accordance with such instructions.

The ROM 2 has prestored therein various programs to be executed by the CPU 1 and various data. The RAM 3 is used as a working memory for temporarily storing various data generated as the CPU 1 executes a predetermined program, as a memory for storing the currently-executed program and data related thereto, and for various other purposes. Predetermined address regions of the RAM 3 are allocated and used as registers, flags, tables, memories, etc. Performance operator/setting operator unit 4A includes, for example, a performance operator for a manual performance by a user, such as a keyboard having a plurality of keys for designating pitches of tones, operators for selecting a musical score and/or lyrics to be displayed on an electronic paper 6A, operators for setting various parameters to be used for reproduction of a music piece, etc. The detection circuit 4 detects depression and release of the keys on the performance operator to thereby produce detection outputs, and operational states of the setting operators to output switch information, corresponding to the detected operational states, to the CPU 1 via the data and address bus 1D. The performance operator may be of any other structural or operating type than the keyboard musical instrument type, such as a stringed instrument type, wind instrument type or percussion instrument type.

LCD display device 5A, which is in the form of a liquid crystal display panel or the like, can display a list of music pieces whose musical scores and/or lyrics are displayable under control of the drive circuit 5, information set via the setting operators (that are also indicated by 4A for convenience of description), controlling states of the CPU 1, etc. The LCD display device is constructed similarly to the conventional display device extensively used in the known electronic musical instruments; heretofore, it has been conventional to display musical scores, lyrics, etc. too on the LCD display device. The LCD display device 5A is advantageous over an electronic paper in that it can achieve a quick response speed in switching between information to be displayed. However, the LCD display device is disadvantageous in that it consumes much greater electric power than the electronic paper, because the display device itself must be illuminated to display music information on its screen and electric power must be constantly supplied to keep the music information displayed on the screen. Also, the display of the music information on the illuminated LCD display device is unsuitable for the user to view for a long time as compared to music information printed on a sheet (or sheets) of ordinary paper or the like. Besides, the LCD display device is disadvantageous over the electronic paper, for example, in that it requires high costs if the screen has a great size. For these reasons, the electronic music apparatus of the invention includes, in addition to the LCD display device 5A, a removably-attachable electronic paper 6A, so that a musical score and/or lyrics can be displayed on the removably-attached electronic paper 6A under control of the electronic paper drive circuit 6.

Figure 2:
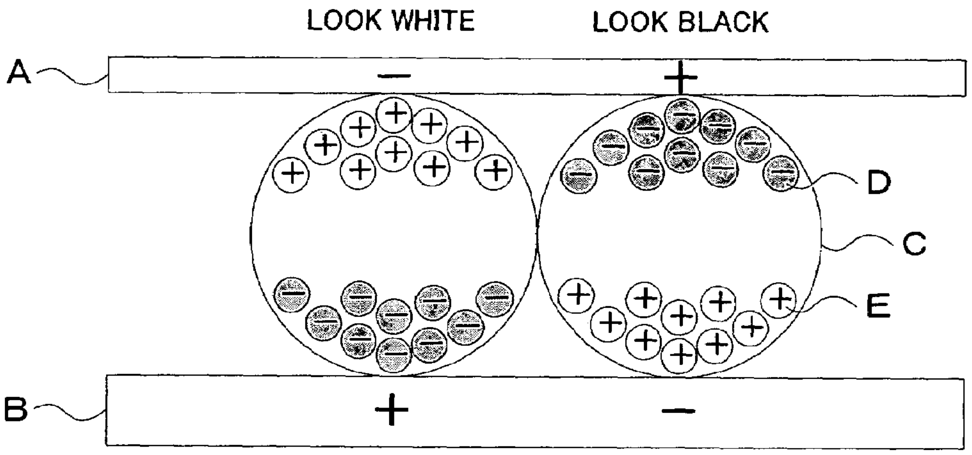
FIG. 2 is a schematic diagram showing an example construction of a microcapsule/electrophoretic type electronic paper attachable to the body of the electronic music apparatus of FIG. 1.

Now, a description will be given about the electronic paper 6A attachable to the body of the electronic music apparatus, with reference to FIG. 2. Whereas various types of electronic papers are known, the electronic paper 6A will be described below as being of a microcapsule/electrophoretic type. FIG. 2 is a schematic view showing an example construction of the microcapsule/electrophoretic type electronic paper.

As shown in FIG. 2, the microcapsule/electrophoretic type electronic paper 6A comprises a pair of a transparent front electrode plate A, for example, in the form of layered transparent films, and a rear electrode plate B, such as a TFT substrate, and a multiplicity of transparent microcapsules C, collectively called “electronic ink”, disposed in a matrix arrangement between the opposed electrode plates A and B; in FIG. 2, only two transparent microcapsules are shown for convenience of illustration. In each of the electrode plates A and B, electrodes are formed in correspondence with the matrix arrangement of the microcapsules C. Black and white fine particles D and E are encapsulated in each of the transparent microcapsules C. Applying electric voltage (electric charges) to the microcapsules C can electrophorese the black and white fine particles D and E for black-and-white displays by the individual microcapsules C on the screen, so that desired images can be displayed on the transparent electrode plate A. More specifically, positive and negative electric charges of a pattern, corresponding to images to be displayed on individual electrodes of the transparent front electrode plate A and rear electrode plate B, are applied to the microcapsules C having encapsulated therein carbon black particles negatively charged as the black fine particles D and titanium oxide particles positively charged as the white fine particles E, so that the white fine particles E are gathered to a negative electric charge side while the black fine particles D are gathered to a positive electric charge side in each of the microcapsules C. In this way, a musical score, lyrics, and/or the like can be displayed on the transparent front electrode plate A as images using while and black colors.

The electronic paper 6A constructed in this manner has the following advantages. First, the electronic paper 6A is easy on the eyes and easy to view because it is of a high-contrast reflection type where images are displayed with light emitted from an external light source without its screen having to be illuminated in its entirety. Further, the electronic paper 6A is thin, lightweight and bendable as necessary, so that it is readily portable. Besides, because the construction of the electronic paper 6A is simple, it can be manufactured at low cost even if its screen has a great size. Furthermore, because the electronic paper 6A can be kept in the music-information displaying state (i.e., can keep the music information displayed on the screen) without having to be constantly powered from an external power source, it can effectively save the power consumption. Where music information, such as a musical score and/or lyrics, is displayed on the electronic paper 6A having such advantages, the music information can be, at a glance, much like a musical score and/or lyrics printed on a sheet (sheets of) paper, and thus the electronic paper 6A can be used without the user having no sense of discomfort. Thus, the electronic music apparatus of FIG. 1 is provided with the electronic paper 6A as a display device other than the LCD display device 5A, so that setting information etc. is displayed on the LCD display device 5A while music information, such as a musical score and/or lyrics, is displayed on the electronic paper 6A; namely, the two display devices are used appropriately in accordance with the contents to be displayed.

Whereas the electronic paper 6A of the microcapsule/electrophoretic type has been described above, the electronic paper 6A employed in the electronic music apparatus of the invention may be of any one of various other known types, such as a twisting ball type, horizontal electrophoretic type and electrolytic deposition/dissolution type. In such a case, the electronic paper 6A is driven by the electronic paper drive circuit 6 in accordance with an appropriate drive scheme corresponding to the type of the electronic paper 6A.

Referring back to FIG. 1, the tone generator (T.G.) circuit 7, which is capable of simultaneously generating tone signals in a plurality of channels, receives, via the data and address bus 1D, various performance information (e.g., automatic performance data) generated in response to user's manipulation on the performance operator (also indicated by 4A for convenience of description), prestored in memory or acquired from an external source, and it generates tone signals based on the received performance information. The tone generator circuit 7 also controls each tone signal to be generated, on the basis of various parameters. Each of the tone signals thus generated by the tone generator circuit 7 is audibly reproduced or sounded by a sound system 9, including an amplifier and speaker, after being imparted with a desired effect via the effect circuit 8. The tone generator circuit 7, effect circuit 8 and sound system 9 may be constructed in any conventionally known manner. For example, any desired tone signal synthesis method may be used in the tone generator circuit 7, such as the FM, PCM, physical model or formant synthesis method. Further, the tone generator circuit 7 may be implemented by either dedicated hardware or software processing performed by the CPU 1, DSP (not shown) or the like.

The external storage device 10 is provided for storing various data, such as performance information to be used for reproduction of a music piece and musical score display information and/or lyrics display information to be used for displaying a musical score and/or lyrics, various control programs (such as those of "initial setting processing", "music piece reproduction processing" and "electronic paper drive processing" to be later described in detail) that are to be executed by the CPU 1, and various control-related data. Where a particular control program is not prestored in the ROM 2, the control program may be prestored in the external storage device (e.g., hard disk device) 10, so that, by reading the control program from the external storage device 10 into the RAM 3, the CPU 1 is allowed to operate in exactly the same way as in the case where the particular control program is stored in the program memory 2. This arrangement greatly facilitates version upgrade of the control program, addition of a new control program, etc. The external storage device 10 may comprise any of various removable-type media other than the hard disk (HD), such as a flexible disk (FD), compact disk (CD-ROM or CD-RAM), magneto-optical disk (MO) and digital versatile disk (DVD), and a semiconductor memory, such as a flash memory.

The MIDI interface (I/F) 11 is provided for inputting performance information of the MIDI format (i.e., MIDI data) from externally-connected other MIDI equipment 11A or the like to the electronic music apparatus, and for outputting performance information of the MIDI format (i.e., MIDI data) from the electronic music apparatus to the other MIDI equipment 11A or the like. The communication interface (I/F) 12 is connected to a wired or wireless communication network X, such as a LAN, via which it can be connected to a desired server computer 12A to receive various desired data from the server computer 12A. It should be appreciated that the communication interface 12 may be of either or both of wired and wireless types.

Furthermore, the electronic music apparatus of the present invention is not limited to the type where the performance operator/setting operator unit 4A, LCD display device 5A, electronic paper 6A, tone generator circuit 7, etc. are incorporated together within the body of the electronic music apparatus; for example, the electronic music apparatus may be constructed in such a manner that the above-mentioned components are provided separately and interconnected via communication facilities such as a MIDI interface, various networks and/or the like. Moreover, the electronic music apparatus of the present invention may be applied to any desired type of apparatus or equipment other than an electronic musical instrument or personal computer, such as a portable phone or other portable communication terminal, karaoke apparatus or game apparatus.

Figure 3:
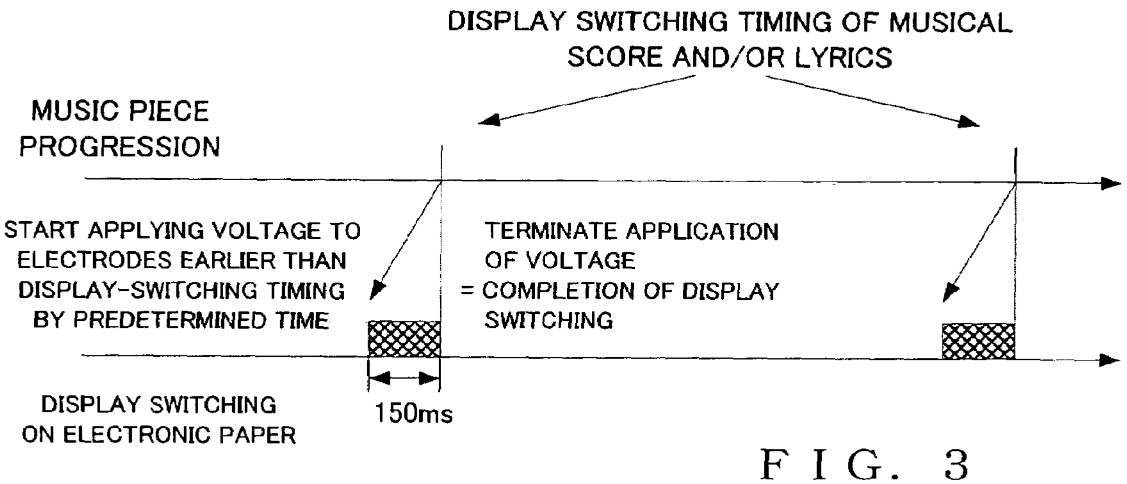
FIG. 3 is a time chart explanatory of time relationship between drive-starting timing and display-switching timing in the electronic music apparatus of FIG. 1.

Because the electronic paper 6A has a superior portability and power-saving capability as set forth above, it can be optimally employed in mobile-type electronic music apparatus etc. having a built-in power supply. Further, because the electronic paper 6A is a reflection-type display device and can be readily constructed to have a great-size screen at low cost, it can readily provide a visual display that is easy on the eyes and easy to view. The electronic paper 6A having such advantages, however, can only achieve an extremely-slow display response speed (i.e., display response time) from a start to completion of each display to be newly made, as compared to the LCD display device 5A or the like; thus, the electronic paper 6A takes a time (e.g., in a range of tens of milliseconds to a hundred and tens of milliseconds) longer than the LCD display device 5A, in switching between displays. Therefore, in the case where such an electronic paper 6A is used as a display device for displaying music information while automatically updating the displayed music information, for example, in accordance with reproduction of a music piece, there arises a need to adjust drive-starting timing of the electronic paper 6A, in consideration of the slow display response speed (i.e., display response time), so that a display-switching driving operation is started prior to so-called "display-switching timing" at which switching to a display of music information corresponding to a given position of a music piece should have been completed prior to reproduction of the given position of the music piece. Namely, it is necessary to determine a predetermined lead time in accordance with a display response characteristic of the electronic paper. Such adjustment of the drive-starting timing of the electronic paper 6A (or determination of the lead time) is explained with reference to FIG. 3. FIG. 3 is a time chart explanatory of time relationship between the drive-starting timing and the display-switching timing in the instant embodiment. Specifically, the "display-switching timing", at which switching to a display corresponding to a given position of a music piece should have been completed in accordance with progression of the music piece is shown in an upper row in FIG. 3, while the "drive-starting timing", for display switching on the electronic paper 6A corresponding to the "display-switching timing", is shown in a lower row in FIG. 3.

In the instant embodiment, there are prepared in advance a plurality of pages of musical score display data and/or a plurality of pages of lyrics display data (i.e., a plurality of pages of music information display data) which are indicative of musical scores and/or lyrics to be displayed on the electronic paper 6A. The pages of the musical score display data and/or lyrics display data are sequentially displayed, page by page, on the electronic paper 6A, in accordance with progression of a reproduced music piece and in accordance with the musical score display data and/or lyrics display data. For example, in a case where a total of 16 measures are displayable per page, a plurality of "display-switching timing" shown in the upper row of FIG. 3 indicate respective reproduction start timing for music piece sections of a 17th measure, 33rd measure, . . . . Therefore, by the first "display-switching timing" in the upper row of FIG. 3, musical score sections (lyrics sections) for the 17th to 32nd measures should have been displayed on the electronic paper 6A. Similarly, by the second "display-switching timing" in the upper row of FIG. 3, musical score sections (lyrics sections) for the 33rd to 48th measures should have been displayed on the electronic paper 6A.

The electronic paper 6A has a slow display response speed (i.e., display response time) and thus takes a long time to switch one display to another, and thus, in the case where the musical score display is switched on the page-by-page basis in accordance with progression of the music piece as noted above, completion of the display switching would be delayed behind the predetermined "display-switching timing" unless drive-starting timing is determined in consideration of the slow display response speed (display response time) of the electronic paper 6A. Consequently, the musical score and/or lyrics can not be displayed exactly in accordance with reproduction of the music piece, which is very inconvenient. Assuming that 150 ms is required for the electronic paper 6A to switch one display to another as illustrated in FIG. 3, application of electric voltage to the transparent front electrode plate and rear electrode plate A and B (see FIG. 2) of the electronic paper 6A has to be started at least 150 ms before the predetermined "display-switching timing". Thus, by the "display-switching timing" that arrives 150 ms later, the necessary page display switching can be completed. Because it is preferable that the display switching be completed somewhat earlier than the "display-switching timing" rather than later than the "display-switching timing", the drive-starting timing may be adjusted to instruct a start of the display-switching drive operation. Particularly, at which timing one display should be switched to another may vary depending on the preference of various users. Therefore, it is preferable that the user be allowed to make appropriate settings or adjusting of the lead time such that the display switching can be completed exactly at or a little earlier than the predetermined "display-switching timing". For this purpose, it is only necessary that the drive-starting timing be adjusted so as to instruct a start of the display-switching drive operation 150 ms earlier than the thus-set display-switching completion timing.

Note that the switching of the display of a musical score, lyrics and/or the like is other than the page-by-page switching; for example, the instant embodiment can effect the display switching while wiping or deleting the previous display per predetermined range, e.g. per letter (in the case of a display of lyrics). Namely, where all of the display elements (i.e., microcapsules C in the described embodiment) are simultaneously driven, the instant embodiment can effect the display switching per page. Where only some of the display elements (microcapsules C), located in a predetermined range, are simultaneously driven, the instant embodiment can effect the display switching while wiping the previous display per predetermined range, e.g. per letter. Alternatively, the display switching may be made about a pointer that indicates a currently-reproduced position of a music piece in accordance with (progression of) the reproduction of the music piece.

Note that, in the instant embodiment, the above-mentioned drive-starting timing (or the lead time) is left unchanged even when a reproduction tempo of a music piece has been changed; that is, the drive-starting timing set in advance is not changed in response to a change in the reproduction tempo. Further, in the instant embodiment, the musical score display data may be generated by analyzing automatic performance data, or logical musical score data and/or musical score image data corresponding to automatic performance data may be prestored in memory. The lyrics display data may also be generated from automatic performance data, or lyrics-displaying image data may be prestored in memory.

Because the LCD display device heretofore used, as a display device for displaying a musical score and/or the like, in the conventional electronic music apparatus has a very quick display response speed (i.e., display response time) as compared to the electronic paper, the musical score and/or the like can be displayed appropriately, with no substantial delay perceivable by the user, even when the display-switching drive operation is started at predetermined "display-switching timing" without the display response speed (i.e., display response time) being taken into account. However, in the case where the electronic paper is used as in the above-described embodiment, and if the display-switching drive operation is started at predetermined "display-switching timing" with no particular consideration of the display response speed (i.e., display response time) as in the conventional technique, then completion of the display switching would be delayed behind reproduction of a corresponding music piece section, so that the display switching will be made with a delay perceivable by the user. Thus, in the instant embodiment, where music information is displayed on the electronic paper 6A while being automatically updated, it is detected when a time point earlier than predetermined "display-switching timing" by a predetermined time (i.e., predetermined lead time) has been reached, and the display-switching drive operation is started with that time point used as "drive-starting timing". In this way, the instant embodiment can display a musical score, lyrics, pointer and/or the like with no delay or deviation from a currently-reproduced position of a music piece. Automatic updating processing for switching one display of music information to another in accordance with reproduction of a music piece will be later described in detail with reference to FIG. 5.

Figure 4:
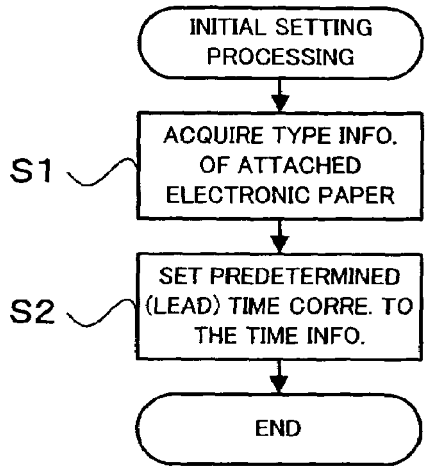
FIG. 4 is a flow chart showing an example operational sequence of initial setting processing.

FIG. 4 is a flow chart showing an example operational sequence of the "initial setting processing" that is carried out in response to attachment, to the body of the electronic music apparatus, of the electronic paper 6A. First, at step S1, type information, indicative of the type of the electronic paper 6A, is acquired from the attached electronic paper 6A. At step S2, a predetermined time is set in accordance with the acquired type information. As known, different type information is attached in advance to each of electronic papers 6A of different makers, model types, etc., and the display response speed for switching one display to another differs among the types of electronic papers. Thus, in the case where the electronic paper is used as a display device as in the instant embodiment, there is a need to adjust the above-mentioned drive-starting timing in accordance with the maker, model type, etc. of the attached electronic paper. Thus, in the instant embodiment of the present invention, a predetermined time (i.e., predetermined lead time) is set at step S2 in accordance with the response speed on the basis of the type information of the attached electronic paper 6A; the predetermined time (i.e., predetermined lead time) defines the "drive-starting timing". The predetermined time may be set as desired by the user. In such a case, the predetermined time must of course be longer than the response speed of the electronic paper 6A.

Figure 5:
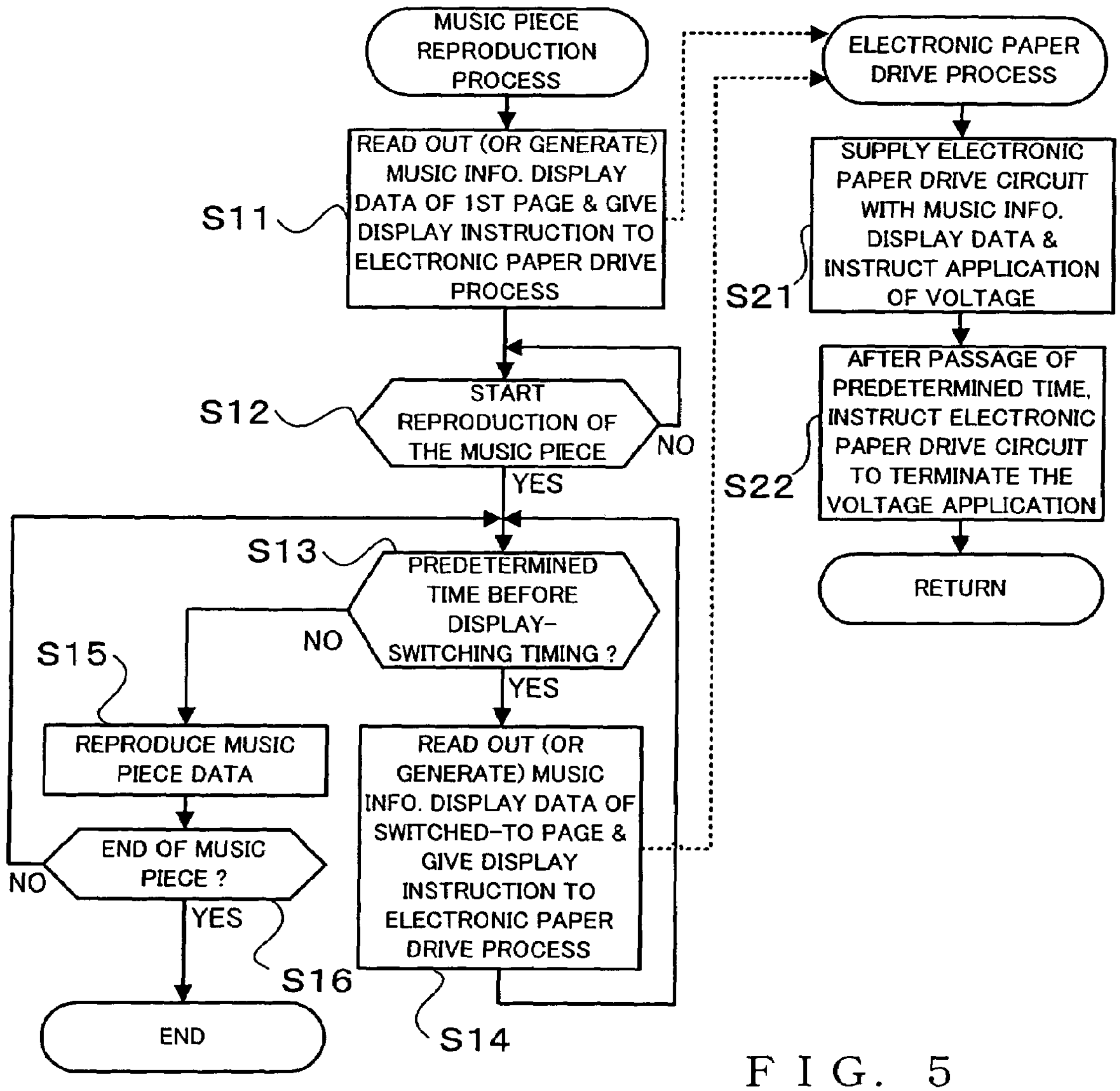
FIG. 5 is a flow chart showing an example operational sequence of processing for switching one display to another in accordance with reproduction of a music piece.

FIG. 5 is a flow chart showing an example operational sequence of the "automatic updating processing" for switching one display to another in accordance with reproduction of a music piece. This automatic updating processing comprises two processes, "music piece reproduction process" and "electronic paper drive process", that are carried out by the CPU 1 concurrently in a parallel fashion. These two processes are illustrated together in FIG. 5 for facilitating understanding and will be explained in accordance with order of various operations. These processes are started up upon powering-on of the electronic music apparatus and terminated upon powering-off of the apparatus.

At step S11 of the "music piece reproduction process", the leading or first page of the music information display data are read out (or generated), and the other process, "electronic paper drive process", is instructed to display the first page. Upon receipt of the display instruction from the "music piece reproduction process", the "electronic paper drive process" supplies the first page of the music information display data to the electronic paper drive circuit 6 and instructs a start of electric voltage application, at step S21. After passage of the predetermined time set through the above-described "initial setting processing" of FIG. 4, termination of the electric voltage application is instructed at step S22. Thus, in accordance with the display instruction given at step S1, electric voltage is applied to the transparent front electrode plate A and rear electrode plate B (see FIG. 2), so that the first page of the music information is initially displayed on the electronic paper 6A. With such an initial display maintained, the "music piece reproduction process" is waited until an instruction for starting the reproduction of the music piece is given (NO determination at step S12). If the instruction for starting the reproduction of the music piece has been given (YES determination at step S12), a further determination is made, at step S13, as to whether an elapsed time from the start of the music piece reproduction has reached a time point earlier than predetermined "display-switching timing" by the predetermined time; namely, this determination is intended to read out "display-switching timing" information earlier than the display-switching timing by the predetermined time. If the elapsed time has reached the time point earlier than the "display-switching timing" by the predetermined time (YES determination at step S13), music information display data of the next (i.e., switched-to) page are read out (or generated), and the "electronic paper drive process" is instructed to display the next page, at step S14. In accordance with such a display instruction, the "electronic paper drive process" repeats the operations of steps S21 and S22, so that the next (switched-to page) of the music information is displayed on the electronic page 6A.

If, on the other hand, the elapsed time has not reached the time point earlier than the "display-switching timing" (NO determination at step S13), the reproduction of the music piece data (automatic performance data) is continued at step S15. At next step S16, a determination is made as to whether the reproduction has come to the end of the music piece, i.e. whether the reproduction of the music piece has been completed. If the reproduction of the music piece has been completed (YES determination at step S16), the music piece reproduction process is brought to an end. If the reproduction of the music piece has not been completed (NO determination at step S16), the music piece reproduction process reverts to step S13 in order to repeat the operations of steps S13-S16.

In the instant embodiment, as having been set forth above, the display-switching driving operation is started slightly (e.g., a time in the range of tens of milliseconds to a hundred and tens of milliseconds) ahead of progression of a music piece during a display of a musical score and/or lyrics of the music piece, in consideration of the slow display response speed of the electronic paper 6A. For such a purpose, a plurality of pages of music information display data are prestored in memory, and, in order to display the music information page by page, it is detected, in accordance with progression of a music piece, when a time point earlier than predetermined "display-switching timing" by a predetermined time (i.e., time necessary for display switching) has been reached, upon which the page-switching drive operation is started. In the case where the electronic paper 6A is employed as a display device for displaying music information as set forth above, it is possible to effectively reduce the power consumption and provide an easy-to-view and easy-on-the eye visual display. To deal with a display delay due to the slow display response speed of the electronic paper 6A, the instant embodiment is arranged to adjust the drive-starting timing in consideration of the slow display response speed, so that it permits a display of the music information with no delay behind the reproduction of the music piece. Namely, although the electronic paper 6A has the disadvantage of the slow display switching speed, the instant embodiment allows any necessary display switching to be completed by predetermined "display-switching timing", by causing the page-switching drive operation to start at a time point earlier than the display-switching timing by the predetermined time (i.e., predetermined lead time).

Further, in the instant embodiment, no electric power is supplied to the electronic paper drive circuit 6 for a time period from the completion of each display switching to the next "display-switching timing". Namely, upon completion of each page switching, driving of the electronic paper 6A is discontinued until a time point earlier than the next display-switching timing by the predetermined time is reached. This arrangement can even further reduce the necessary power consumption by the electronic paper 6A.

Furthermore, the electronic paper 6A may be fixedly provided on the electronic music apparatus rather than being removably provided on the electronic music apparatus via a dedicated interface or general-purpose interface, such as a USB. Alternatively, the electronic paper 6A may be physically separated from the body of the electronic music apparatus, in which case a display switching instruction may be given wirelessly from the body of the electronic music apparatus. In the case where the electronic paper 6A is fixedly provided on the body of the electronic music apparatus, the electronic paper 6A is preferably fixed on a music rest, while, in the case where the electronic paper 6A is removably provided on the electronic music apparatus, the electronic paper 6A is preferably formed into a shape (e.g., size and thickness similar to those of a paper-made musical score) such that it can be placed appropriately on the music rest. Furthermore, in the case where the electronic paper 6A is removably provided on the electronic music apparatus, the electronic paper drive circuit 6 may be either fixed to the body of the electronic music apparatus or removably provided on the electronic music apparatus along with the electronic paper 6A. Furthermore, any one or more of a plurality of types of electronic papers 6A may be removably connected to the body of the electronic music apparatus. In such a case, the "predetermined time" is preferably varied in accordance with the type of the electronic paper 6A connected, since the display response speed depends on the type of the electronic paper 6A. The "predetermined time" may be set by the user or automatically set in response to detection of the type of the electronic paper 6A.

In the case where the electronic paper 6A is fixedly provided on the body of the electronic music apparatus, the "predetermined time" corresponding to the electronic paper 6A may be stored in memory in advance without the "predetermined time" being set through the "initial setting processing". Further, a desired time longer than the display response time may be set, as the predetermined time, by the user.

Furthermore, in the case where the electronic paper 6A and other display device (e.g., LCD display device 5A) are employed as in the above-described embodiment, either a same kind of information (e.g., musical score or lyrics) or different kinds of information may be displayed on the electronic paper 6A and other display device (5A). For example, one page of the same information may be displayed on the electronic paper 6A, and only a portion of the page (e.g., a portion at and around a currently-reproduced position of a music piece) may be displayed on the other display device.

Whereas the pointer display or wiping-based lyrics display on a musical score may be constantly updated per predetermined time required for display switching, the present invention is not so limited; for example, the pointer display or wiping-based lyrics display may be updated per predetermined time longer than the above-mentioned predetermined time (i.e., per second predetermined time that is, for example, equal to the length of a quarter note (e.g., 500 ms when the tempo is "120" or 250 ms when the tempo is "240") and hence longer than the above-mentioned "predetermined time" (i.e., predetermined lead time)).

What is claimed is:

1. A music information display apparatus comprising:

an electronic paper;

an acquisition section that acquires music information related to reproduction and display of a music piece;

a detection section that detects timing for switching a display, on the basis of the acquired music information, earlier than actual display-switching timing by a predetermined lead time; and a display control section that, in accordance with a detection by said detection section, instructs said electronic paper to start a display switching operation based on the music information.

2. A music information display apparatus as claimed in claim 1, wherein:

said electronic paper includes a multiplicity of microcapsules of electronic ink between a transparent front electrode plate and a rear electrode plate, and fine ink particles are encapsulated in each of the microcapsules, and each of the electrode plates has a plurality of electrodes arranged in correspondence with arrangement of the microcapsules, and a desired ink pattern is presented on the transparent electrode plate by application of electric charges to the electrodes corresponding to the microcapsules.

3. A music information display apparatus as claimed in claim 1, wherein said electronic paper is of any one of a microcapsule/electrophoretic type, a twisting ball type, a horizontal electrophoretic type, or an electrolytic deposition/dissolution type.

4. A music information display apparatus as claimed in claim 1, wherein said music information to be displayed by said electronic paper includes a plurality of pages of musical score display data.

5. A music information display apparatus as claimed in claim 1, wherein said music information to be displayed by said electronic paper includes a plurality of pages of lyrics display data.

6. A music information display apparatus as claimed in claim 1, wherein said electronic paper is removably provided on an electronic music apparatus via a predetermined interface, and said control section is included in said electronic music apparatus.

7. A music information display apparatus as claimed in claim 1, wherein said electronic paper is provided or placed on a music rest of an electronic music apparatus, and said control section is included in said electronic music apparatus.

8. A music information display apparatus as claimed in claim 1, wherein said electronic paper is communicable with an electronic music apparatus via a wireless system, and said control section is included in said electronic music apparatus.

9. A music information display apparatus as claimed in claim 1, further comprising:

a determination section that determines said predetermined lead time in accordance with a display response characteristic of said electronic paper.

10. A music information apparatus as claimed in claim 9, wherein said predetermined lead time is a response delay time of said electronic paper involved when said electronic paper switches one display to another.

11. A music information display apparatus as claimed in claim 9, wherein said music information to be displayed by said electronic paper includes a plurality of pages of musical score display data.

12. A music information display apparatus as claimed in claim 9, wherein said music information to be displayed by said electronic paper includes a plurality of pages of lyrics display data.

13. A music information display apparatus as claimed in claim 9, wherein said music information display apparatus is included in an electronic music apparatus, and said electronic paper is removably provided on said electronic music apparatus via a predetermined interface.

14. A music information display apparatus as claimed in claim 9, wherein said music information display apparatus is included in an electronic music apparatus, and said electronic paper is provided or placed on a music rest of said electronic music apparatus.

15. A music information display apparatus as claimed in claim 9, wherein said music information display apparatus is included in an electronic music apparatus, and said electronic paper communicates with said electronic music apparatus via a wireless system.

16. A music information apparatus as claimed in claim 9, wherein said predetermined lead time is adjustable by a user.

17. A music information apparatus as claimed in claim 9, wherein said predetermined lead time is not changed in response to a change in a reproduction tempo of the music piece.

18. A music information apparatus as claimed in claim 9, wherein said electronic paper is removably provided on said music information apparatus, and said determination section determines said predetermined lead time in accordance with a display response characteristic of the electronic paper currently attached to said music information apparatus.

19. A method for displaying music information in an electronic paper comprising:

a step of acquiring music information related to reproduction and display of a music piece;

a step of determining a predetermined lead time in accordance with a display response characteristic of said electronic paper;

a detection step of, in accordance with reproduction of a music piece based on the music information acquired by said step of acquiring, detecting timing for switching a display based on the acquired music information, in correspondence with the music piece being reproduced, earlier than actual display-switching timing by the predetermined lead time; and a step of, in accordance with a detection by said detection step, instructing said electronic paper to start a display switching operation based on the music information.

20. A computer-readable storage medium storing a computer program for displaying music information in an electronic paper, the computer program including:

a code for acquiring music information related to reproduction and display of a music piece;

a code for determining a predetermined lead time in accordance with a display response characteristic of said electronic paper;

a code for, in accordance with reproduction of a music piece based on the music information acquired by the acquiring code, detecting timing for switching a display based on the acquired music information, in correspondence with the music piece being reproduced, earlier than actual display-switching timing by the predetermined lead time; and a code for, in accordance with the timing detected by the timing detection code, instructing said electronic paper to start a display switching operation based on the music information.

* * * * *